United States Patent Office 3,405,193
Patented Oct. 8, 1968

3,405,193
PROCESS FOR PREPARING NON-CONJUGATED
DIENES
Go Hata, Masahiro Aoyama, Masaki Nishino, and Akihisa Miyake, Kamakura-shi, Japan, assignors to Toyo Rayon Kabushiki Kaisha, Tokyo, Japan, a corporation of Japan
No Drawing. Filed Sept. 28, 1967, Ser. No. 671,192
Claims priority, application Japan, Oct. 4, 1966, 41/64,911
16 Claims. (Cl. 260—680)

ABSTRACT OF THE DISCLOSURE

The preparation of non-conjugated dienes wherein conjugated diolefinic hydrocarbons along with ethylene are contacted with a catalyst composed of a cobalt salt, a sulfur-containing tertiary phosphine and an organo-aluminum compound.

This invention relates to a process for preparing non-conjugated dienes by the addition reaction of conjugated diolefinic hydrocarbons and ethylene. More particularly, this invention relates to a process for preparing non-conjugated dienes by reacting conjugated diolefinic hydrocarbons with ethylene in the presence of a new catalyst consisting of a cobalt salt, a sulfur-containing tertiary phosphine and an organoaluminum compound.

The non-conjugated dienes, for instance, 1,4-hexadiene, 5-alkyl-1,4-hexadiene and 3-alkyl-1,4-hexadiene, are compounds having various valuable uses as intermediates. Recently, the non-conjugated dienes have been attracting attention particularly as the third component for imparting sulfur vulcanizability to the ethylene-propylene copolymer the so-called ethylene-propylene rubber.

However, most of the processes for producing non-conjugated dienes not only required a great number of processing steps, but also the cost of the starting material was high. Thus, the economic value of these processes was low. Recently, a disclosure in U.S. Patent 3,152,195 (British patent specification No. 948,041) describes a process of producing non-conjugated dienes from either ethylene or propylene and butadiene. The catalyst used in this process, however, is a very costly one such as rhodium trichloride, and hence the cost of production becomes inevitably high. Further, a process using as a catalyst a nickel-phosphorous complex for a similar reaction has been known (French Patent No. 1,388,305). The catalyst used in this process, however, has a defect of a low selectivity for the product and, therefore, disadvantageous, also.

As a result of investigations with a view to finding a method of achieving the aforesaid addition reaction effectively, we succeeded in developing a new catalyst system which can give the non-conjugated dienes in good yield with high selectivity.

The catalyst used in this invention consists of
(a) a salt of cobalt,
(b) a sulfur-containing tertiary phosphine of the formula (1) 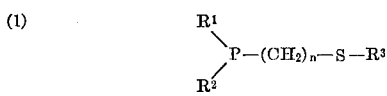

or (2) 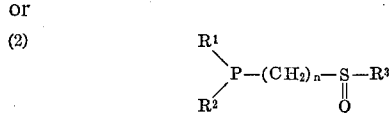

wherein $R^1$, $R^2$ and $R^3$ are the same or different organic groups and $n$ is an integer 2 or 3, and
(c) an organic aluminum compound represented by the formula (3) 

wherein $R^4$ and $R^5$ are hydrocarbon groups having 1 to 10 carbon atoms, and X is a hydrocarbon group having 1 to 10 carbon atoms or a halogen atom.

As the cobalt salt, one of the components of the catalyst, any of the inorganic and organic salts and chelate compounds of cobalt can be used. As specific examples of these cobalt salts, mention can be made of cobalt halide such as cobalt chloride, cobalt bromide and cobalt iodide, cobalt salts of inorganic acid such as cobalt nitrate and cobalt thiocyanate, cobalt salts of organic acid such as cobalt acetate, cobalt propionate, cobalt benzoate and cobalt naphthenate, and chelate compounds of cobalt such as cobalt (II) acetylacetonate, cobalt (III) acetylacetonate and cobalt (II)-ethyl acetoacetate enolate.

The sulfur-containing tertiary phosphines, one of the other components of the catalyst, as indicated by the Formula 1 or 2, must be those in which the polymethylene chain between the sulfur and phosphorus atom is of two or three methylene units. A sulfur-containing tertiary phosphine having a polymethylene chain longer than this has no effect whatsoever as the catalyst component. The organic groups indicated by $R^1$, $R^2$ and $R^3$ in the formula may be alkyl, aryl, alkaryl, aralkyl or alkoxyaryl having 1–10 carbon atoms. Specific examples of the sulfur-containing tertiary phosphines which are especially suitable include diphenyl[2-(ethylthio)ethyl]phosphine,
di-p-tolyl[2-(ethylthio)ethyl]phosphine,
diethyl[2-(ethylthio)ethyl]phosphine,
diphenyl[2-(phenylthio)ethyl]phosphine,
diethyl[2-(phenylthio)ethyl]phosphine,
diphenyl[3-(phenylthio)propyl]phosphine,
diphenyl[2-(O-methoxyphenylthio)ethyl]phosphine,
diphenyl[2-(benzylthio)ethyl]phosphine,
diphenyl-[2-(ethylsulfinyl)ethyl]phosphine,
diphenyl[2-(phenylsulfinyl)ethyl]phosphine,
diethyl[2-(ethylsulfinyl)ethyl]phosphine,
diphenyl[3-(ethylsulfinyl)propyl]phosphine,
diphenyl[2-(cyclohexylthio)ethyl]phosphine, and
diphenyl[2-(n-octylsulfinyl)ethyl]phosphine.

The organic aluminum compound, the third component of the catalyst, is represented by the general Formula 3 wherein $R^4$ and $R^5$ are the same or different hydrocarbon groups, preferably alkyl groups, having 1 to 10 carbon atoms, and X is a hydrocarbon group having 1 to 10 carbon atoms as $R^4$ and $R^5$ or a halogen atom, preferably chlorine or bromine atom. Specific examples include triethylaluminum, triisobutylaluminum, trihexylaluminum, trioctylaluminum, diethylaluminum chloride, diisobutylaluminum chloride, di-n-butylaluminum chloride and diethyl-aluminum bromide.

The invention catalyst can be obtained by mixing the aforementioned three components. While there is no particular restriction as to the proportion in which these three components are mixed, normally, 0.5–10 moles, and preferably 1–3 moles, of the sulfur-containing tertiary phosphine and 2–50 moles, and preferably 6–20 moles, of the organoaluminum compound are used per mole of the cobalt salt. From the standpoint of convenience of operation, these catalyst components are best used dissolved in an inert organic solvent such as benzene, toluene and xylene. A particularly high activity of the catalyst is demonstrated when the mixing of these three components is carried out in the conjugated diolefinic hydrocarbons, the starting material. The amount used of the catalyst may sufficiently be small. Normally, the cobalt salt is used in a range of 0.01 to 0.00001 mole per mole of the starting conjugated diolefinic hydrocarbon.

The invention process comprises bringing a conjugated diolefinic hydrocarbon, along with ethylene, into contact with the aforesaid catalyst to form a non-conjugated diene having ethylene added to the carbon atom in the position 1 or 4 of the said conjugated diolefinic hydrocarbon, and recovering the non-conjugated diene thus formed.

The foregoing conjugated diolefinic hydrocarbons are non-substituted or substituted 1,3-butadiene which can be represented by the formula

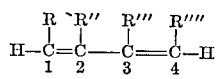

wherein R′, R″, R‴, and R⁗ may be the same or different and are hydrogen or hydrocarbon groups of 1–6 carbon atoms. The hydrocarbon groups of 1–6 carbon atoms include those of aliphatic, alicyclic or aromatic group. Specific examples of the conjugated diolefinic hydrocarbons which are particularly used with convenience include 1,3-butadiene, 2-methyl-1,3-butadiene, 1-methyl-1,3-butadiene, 2,3-dimethyl-1,3-butadiene, 1,4-dimethyl-1,3-butadiene, 2,4-dimethyl-1,3-butadiene, 2-phenyl-1,3-butadiene and 2-cyclohexyl-1,3-butadiene.

In the addition reaction according to this invention, a reaction temperature ranging between 10° and 150° C. is employed, a particularly preferred range being between 60° and 100° C. The reaction is preferably carried out under pressure of ethylene, and especially when the reaction is carried out under an ethylene pressure of 20–60 kg./cm.², the progress of the reaction is greatly accelerated.

According to the method of the present invention, one of the hydrogen atoms of the ethylene is attached to one of the carbon atoms in the position 1 or 4 of the conjugated diolefin while the residual group of the ethylene is attached to the other to form 1,4-dienes.

When shown by an equation, a mode of addition of ethylene is as follows:

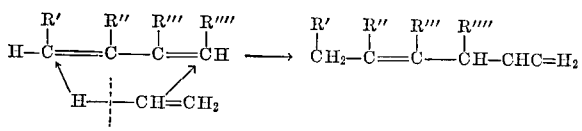

The desired non-conjugated dienes can be synthesized by the invention process by suitably varying the conditions within the ranges indicated hereinabove of the present invention. The relationship between the kinds of the conjugated diolefinic hydrocarbons used and the resulting non-conjugated dienes is, in general, as follows:

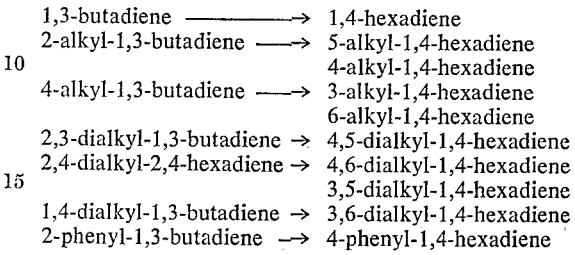

According to the process of the present invention, it is possible to obtain non-conjugated dienes at high yields from conjugated diolefins and ethylene without employing an expensive noble metal compound used in the conventional processes such as the rhodium chloride catalyst used in the process of U.S. Patent No. 3,152,195 (British Patent No. 948,041). The process of the present invention is advantageous as an industrial process over the conventional arts in that the high selectivity of the catalyst of the present invention can be maintained even at a high conversion of conjugated diolefins. The selectivity of 1,4-hexadiene attained by the catalyst disclosed in said U.S. patent is 85%, but it is attained at the conversion of less than 60%. In the process described in French Patent No. 1,388,305, the selectivity of 80% is attained at the conversion of 25%. For instance, when the conversion is 35% in the process of said French patent, the selectivity is lowered to 19%. Thus, when the conversion is elevated in the conventional processes, the selectivity of 1,4-hexadiene is lowered and an increasing amount of 2,4-hexadiene is formed as a by-product. On the other hand, when the catalyst of the present invention is employed, the selectivity of 1,4-dienes can be maintained at 90% even at the conversion of 85%.

The following examples are given for further illustrating the invention.

Example 1

A 100-cc. autoclave purged with argon gas was charged with 5 cc. of toluene, 0.068 gram (0.5 millimole) of anhydrous cobalt chloride and 0.274 gram (1 millimole) of diphenyl[2-(ethylthio)ethyl]phosphine to which were further added 26 cc. of liquefied butadiene and 3 cc. of a toluene solution of triethylaluminum (containing 6 millimoles of triethylaluminum). After stirring the mixture for 30 minutes at room temperature, it was heated at 80° C. and maintained under an ethylene pressure of 40 kg./cm.² for 3 hours with stirring to yield 17.3 grams of 1,4-hexadiene. The high boiling residue amounted to 1.2 grams. When acetylacetonate (II), bromides (II and III), acetate (II) and benzoate (II) of cobalt were each used in equimolar amounts instead of the foregoing cobalt chloride, 1,4-hexadienes were likewise obtained. The conversion was 85, and the selectivity, 90.

Examples 2–18

The same reaction as that of Example 1 was carried out except that as catalyst those of the following composition were used and the products shown in the following table were obtained.

Reaction conditions: Cobalt chloride 0.5 millimole, sulfur-containing tertiary phosphine 1 millimole, organoaluminum 6 millimoles, butadiene 26 cc., ethylene pressure 40 kg./cm.², reaction temperature 80° C.

| Example | Catalyst System | Reaction time (min.) | Product (g.) 1,4-Hexadiene | Product (g.) 2,4-Hexadiene | Product (g.) C₃ Hydrocarbons | Residue | Conversion (mole percent) | Selectivity (wt. percent) |
|---|---|---|---|---|---|---|---|---|
| 2 | Ph₂PCH₂CH₂SEt—Et₂AlCl | 180 | 20.7 | 0.6 | 1.1 | 0.3 | 95 | 91.5 |
| 3 | Ph₂PCH₂CH₂SEt—Et₃Al (‖O) | 10 | 20.4 | 0.8 | | 0.7 | 94 | 91.2 |
| 4 | (cyclo C₆H₁₁)₂PCH₂CH₂SEt—Et₂AlCl | 80 | 18.4 | 0.7 | 0.5 | 1.2 | 90 | 86 |
| 5 | Ph₂PCH₂CH₂SEt—Et₂AlCl (‖O) | 180 | 17.8 | | | 2.1 | 88 | 85 |
| 6 | Ph₂PCH₂CH₂S-n-C₈H₁₇—Et₂AlCl | 20 | 19.1 | 0.6 | 0.9 | 0.5 | 89 | 90 |
| 7 | Ph₂PCH₂CH₂SPh—Et₂Al | 50 | 19.3 | 0.6 | 0.9 | 0.6 | 90 | 90 |
| 8 | Ph₂PCH₂CH₂SPh—Et₂AlCl | 30 | 21.4 | 0.9 | 1.3 | 0.3 | 98 | 92 |
| 9 | Ph₂P(CH₂)₃SPh—Et₃Al | 30 | 20.6 | 0.5 | 0.3 | 0.6 | 95 | 91 |
| 10 | Ph₂P(CH₂)₃SPh—Et₂AlCl | 20 | 19.7 | 0.9 | 0.9 | 0.4 | 92 | 90 |
| 11 | (P-CH₃C₆H₄)₂PCH₂CH₂SPh—Et₂AlCl | 180 | 19.6 | 0.3 | 0.9 | 0.2 | 90 | 91.6 |
| 12 | Ph₂PCH₂CH₂SEt—(i-C₄H₉)₃Al | 180 | 21.4 | 0.7 | | 1.1 | 100 | 90 |
| 13 | Ph₂P(CH₂)₂SC₆H₄OCH₃(ortho)—Et₃Al | 60 | 20.8 | 0.5 | 0.9 | 0.5 | 95 | 92 |
| 14 | Ph₂P(CH₂)₂S-CH₂Ph—Et₂AlCl | 180 | 19.3 | 0.4 | 1.2 | 0.9 | 92 | 88 |
| 15 | Et₂PCH₂CH₂S-Et—Et₂AlCl | 80 | 17.4 | 0.6 | 1.1 | 0.9 | 85 | 86 |
| 16 | Et₂PCH₂CH₂S-Et—Et₃Al (‖O) | 20 | 19.3 | 0.6 | | 1.0 | 90 | 90.2 |
| 17 | Et\Ph/PCH₂CH₂S-Et—Et₂AlCl | 20 | 18.6 | 0.6 | 0.6 | 1.1 | 90 | 87 |
| 18 | Et₂PCH₂CH₂SPh—Et₃Al | 180 | 20.4 | 0.7 | | 1.0 | 95 | 90.1 |

NOTE.—Ph and Et denote phenyl and ethyl, respectively.

Example 19

A 100-cc. autoclave was charged with 5 cc. of xylene, 20.4 grams of isoprene, 0.290 gram (1 millimole) of diphenyl[2-(ethylsulfinyl)ethyl]phosphine, 0.156 gram (0.5 millimole) of cobalt (II) ethylacetoacetate enolate and 6 millimoles of triethylaluminum, after which the mixture was heated at 80° C. and maintained for one hour under ethylene pressure of 40 kg./cm.² with stirring. A mixture (22.0 grams) of 4-methyl-1,4-hexadiene and 5-methyl-1,4-hexadiene were obtained.

Example 20

A 100-cc. autoclave was charged with 10 cc. of xylene, 20.4 g. of 1,3-pentadiene (purity=90%), 0.12 g. of cobalt nitrate, 0.304 g. of diphenyl[3-(ethylsulfinyl)propyl]phosphine and 6 millimoles of trihexylaluminum. The mixture was stirred at 80° C. under an ethylene pressure of 40 kg./cm.² for one hour. There was obtained 22.5 g. of a mixture of 3-methyl-1,4-hexadiene and 1,4-heptadiene. The conversion was 90%, and the selectivity, 89%.

Example 21

A 100-cc. autoclave was charged with 10 cc. of toluene, 24.6 g. of 2,3-dimethyl-1,3-butadiene, 0.068 g. of cobalt chloride, 0.27 g. of diphenyl[2-(ethylthio)ethyl]phosphine and 6 millimoles of diethylaluminum chloride. The mixture was stirred at 80° C. under an ethylene pressure of 40 kg./cm.² for one hour. There was obtained 25 g. of 4,5-dimethyl-1,4-hexadiene. The conversion was 85%, and the selectivity, 90%.

Example 22

The reaction was carried out under the same conditions as in Example 20 except the use of 24.6 g. of 2-methyl-1,3-pentadiene in place of the 2,3-dimethylbutadiene of Example 21. There was obtained 23 g. of a mixture of 4-methyl-1,4-heptadiene and 3,5-dimethyl-1,4-hexadiene.

Example 23

A 100-cc. autoclave was charged with 10 cc. of toluene, 0.059 g. of cobalt thiocyanate, 0.32 g. of diphenyl[2-(phenylthio)ethyl]phosphine, 26 cc. of liquefied butadiene and 6 millimoles of diethyl aluminum bromide. The mixture was stirred at 80° C. under an ethylene pressure of 40 kg./cm.² for 20 minutes. There was obtained 19.3 g. of 1,4-hexadiene.

Example 24

A 100-cc. autoclave was charged with 5 cc. of toluene, 13.0 g. of 2-phenylbutadiene, 0.05 g. of cobalt naphthenate, 0.068 g. of diphenyl[2-(ethylsulfinyl)ethyl]phosphine and 6 millimoles of diethylaluminum chloride. The mixture was heated at 80° C. and stirred for one hour under an ethylene pressure of 40 kg./cm.² As a result, 11.9 g. of 4-phenyl-1,4-hexadiene was obtained. The conversion was 85%, and the selectivity, 90%.

We claim:
1. A process for preparing non-conjugated dienes having ethylene added to the carbon atom in the 1- or 4-position of conjugated diolefinic hydrocarbons, the process comprising contacting a conjugated diolefinic hydrocarbon with a catalyst, along with ethylene, the said conjugated diolefinic hydrocarbon being of the formula:

$$\begin{array}{cccc} R' & R'' & R''' & R'''' \\ | & | & | & | \\ HC= & C & —C & =CH \end{array}$$

wherein R', R'', R''' and R'''' independently represent a member selected from the class consisting of hydrogen and hydrocarbon groups of 1 to 6 carbon atoms, the said catalyst consisting of
(a) a salt of cobalt,
(b) a sulfur-containing tertiary phosphine selected from the group having the formulas

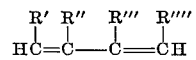

and

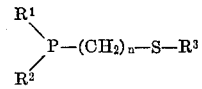

wherein $R^1$, $R^2$ and $R^3$ are the same or different organic groups and $n$ is an integer 2 or 3, and
(c) an organoaluminum compound of the formula

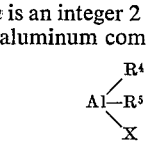

wherein $R^4$ and $R^5$ are hydrocarbon groups having 1–10 carbon atoms, and X is a hydrocarbon group with 1–10 carbon atoms or a halogen atom.

2. The process according to claim 1 wherein the said catalyst consists of one mole of the cobalt salt, 0.5–10 moles of the sulfur-containing tertiary phosphine and 2–50 moles of the organoaluminum compound.

3. The process according to claim 1 wherein a mole ratio of the cobalt salt to the conjugated diolefine is in a range of 0.01–0.00001.

4. The process according to claim 1 wherein the reaction is effected at a temperature ranging from 10° to 180° C.

5. The process according to claim 1 wherein the reaction is effected under superatomospheric pressure of ethylene.

6. The process according to claim 1 wherein the reaction is effected in the presence of a chemically inert organic solvent.

7. The process according to claim 1 wherein the said conjugated diolefinic hydrocarbon is 1,3-butadiene.

8. The process according to claim 1 wherein the said conjugated diolefinic hydrocarbon is 2-methyl-1,3-butadiene.

9. The process according to claim 1 wherein the said conjugated diolefinic hydrocarbon is 2,3-dimethyl-1,3-butadiene.

10. The process according to claim 1 wherein the salt of cobalt is cobalt chloride.

11. The process according to claim 1 wherein the salt of cobalt is cobalt acetate.

12. The process according to claim 1 wherein the salt of cobalt is cobalt acetylacetonate.

13. The process according to claim 1 wherein the sulfur-containing tertiary phosphine is diphenyl[2-(ethylthio)ethyl]phosphine.

14. The process according to claim 1 wherein the sulfur-containing tertiary phosphine is diphenyl[2-(phenylthio)ethyl]phosphine.

15. The process according to claim 1 wherein the organoaluminum compound is triethyl aluminum.

16. The process according to claim 1 wherein the organoaluminum compound is diethylaluminum chloride.

References Cited
FOREIGN PATENTS 1,462,308  11/1966  France.

PAUL M. COUGHLAN, JR., *Primary Examiner.*